No. 707,588. Patented Aug. 26, 1902.
N. HERBRAND.
ATTACHMENT FOR HARNESS.
(Application filed June 8, 1901.)
(No Model.)

Witnesses,
W. H. Palmer
Emily Eastman

Inventor,
Nicholaus Herbrand.
by Lothrop & Johnson
his Attorneys.

THE NORRIS PETERS CO., PHOTO-LITHO., WASHINGTON, D. C.

UNITED STATES PATENT OFFICE.

NICHOLAUS HERBRAND, OF COLDSPRING, MINNESOTA, ASSIGNOR OF ONE-HALF TO FRANK PAUL, OF COLDSPRING, MINNESOTA.

ATTACHMENT FOR HARNESS.

SPECIFICATION forming part of Letters Patent No. 707,588, dated August 26, 1902.

Application filed June 8, 1901. Serial No. 63,671. (No model.)

*To all whom it may concern:*

Be it known that I, NICHOLAUS HERBRAND, a citizen of the United States, residing at Coldspring, in the county of Stearns and State of Minnesota, (whose post-office address is general delivery,) have invented certain new and useful Improvements in Attachments for Harness, of which the following is a specification.

My invention is an improved construction of tug-strap hook and supporting-frame, its object being particularly to provide a construction of frame which can be easily taken apart to permit of removal of the hook.

My invention further consists in the features of construction and combination hereinafter specifically described and claimed.

Figure 1:
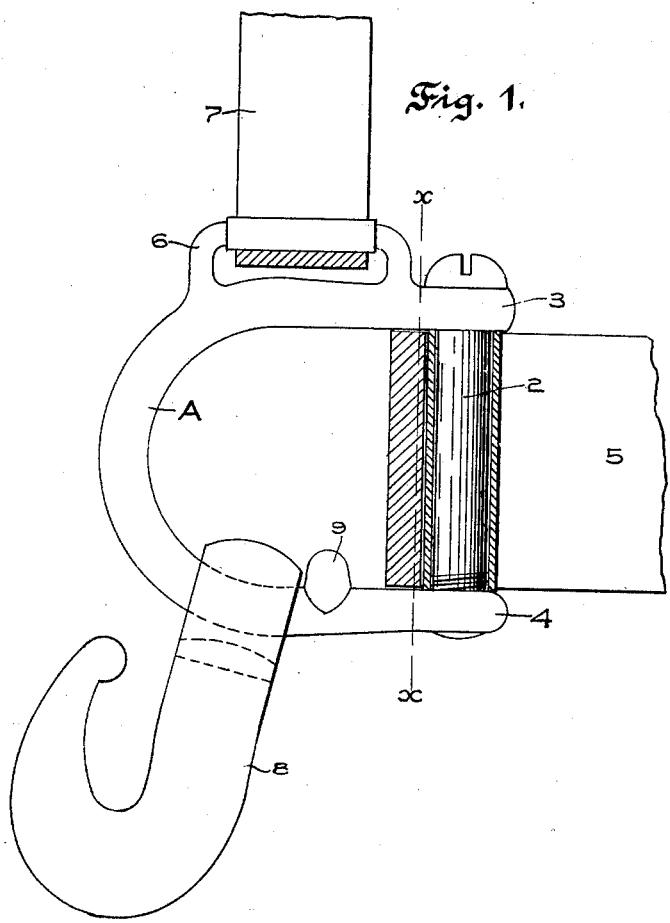
Figure 2:
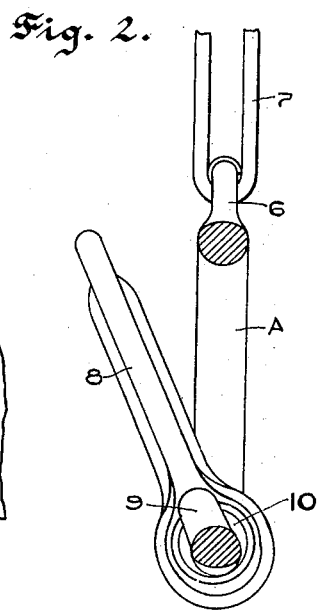
Figure 3:
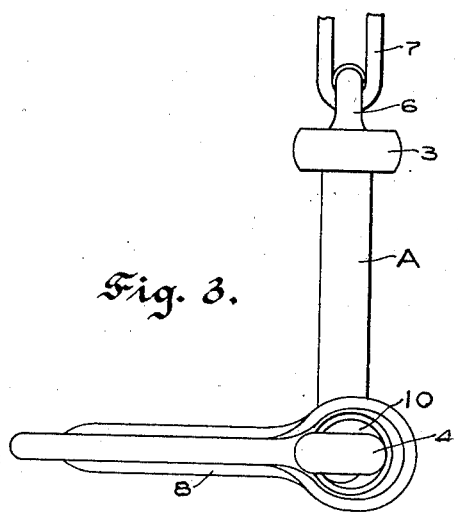
Figure 4:

In the accompanying drawings, forming part of this specification, Figure 1 is an elevation of my improved hook and supporting-frame. Fig. 2 is a section on line $x$ $x$ of Fig. 1, showing the hook turned upward into position for removal. Fig. 3 is an end view of the frame with the cross-bolt removed, showing the hook turned at right angles to the frame; and Fig. 4 is a top view of the hook and frame.

In the drawings, A represents the frame or ring which supports the hook and by which it is attached to the harness. As shown, I construct the frame with an open end, which I close by means of the bolt 2, which passes through one of the ends 3 of the frame and is secured in the opposite end 4. The bolt 2 supports the rear end of the tug 5. In order to support the frame A from the harness, I provide it with the upwardly-extending eye 6, through which passes the end of the supporting-strap 7. Upon the opposite or lower side of the frame is hung the ordinary hook 8, the hook being held at the rear end of the frame by means of the projection or stop 9.

In order to remove the hook 8 from the frame after the bolt 2 has been removed, I form a hook-opening 10 of the elongated shape shown in Figs. 2 and 3. Thus by holding the hook in the position shown in Fig. 2 it can be carried over the stop 9, and then by turning the hook downward to a position at right angles to the frame, as shown in Fig. 3, it can be carried over the end 4, as shown in Fig. 3.

I claim—

A harness attachment consisting of a frame supported from the harness and provided with a detachable tug-connecting bolt, a hook loosely hung upon said frame, and an upwardly-extending stop upon the lower side of the frame, said hook being formed with an elongated eye to allow it to be carried past said stop, as and for the purpose set forth.

In testimony whereof I affix my signature in presence of two witnesses.

NICHOLAUS HERBRAND.

Witnesses:
H. S. JOHNSON,
W. H. PALMER.